UNITED STATES PATENT OFFICE.

P. H. VANDER WEYDE, OF NEW YORK, N. Y.

IMPROVED APPLICATION OF GRAHAMITE IN THE MANUFACTURE OF GUNPOWDER AND LAMP-BLACK.

Specification forming part of Letters Patent No. 87,382, dated March 2, 1869; antedated February 13, 1869.

*To all whom it may concern:*

Be it known that I, P. H. VANDER WEYDE, of New York, county and State of New York, have invented new uses for the mineral grahamite, first, as a substitute for charcoal in the manufacturing of gunpowder, improving its quality considerably, and, second, as a material for the manufacturing of a superior kind of lamp-black.

To make grahamite gunpowder, I first grind the mineral very fine, take fourteen parts of the same; of sulphur, eleven parts, and of niter seventy-five parts, varying these proportions according to the purposes for which the gunpowder is intended, either for blasting, rifles, cannon, &c.; moisten the mixture and treat it as is common with all gunpowder. The facts are that the sulphur and niter are easily to be obtained in a uniform normal condition of sufficient purity; but the charcoal will vary, and it is only with the utmost difficulty that an article of uniform quality can be obtained. Experience has proved that the quality of the gunpowder depends, besides the proportion of the ingredients, greatly on the quality of the charcoal. The wood must not be burned too much, as then this will be deprived of the hydrogen and oxygen to a too large extent. A quite imperfectly-burned charcoal from willow wood of brown color has by experience been proved to be the best adapted for the superior qualities of gunpowder. The composition of this charcoal has been found to be: carbon, seventy-six per cent.; hydrogen, five and eight-tenths per cent.; oxygen, fourteen per cent.; ashes, two and two-tenths per cent. (See Will's Jahresbericht, pr. 1863, page 743.)

The composition of the mineral grahamite is, according to the analysis of Prof. Wurtz and Dr. Maier, (see report of the mineral found in western Virginia, by Prof. Wurtz, page 12:) carbon, seventy-six and forty-five hundredths; hydrogen, seven and eighty-two hundredths; oxygen, thirteen and forty-six hundredths; ashes, two and twenty-six hundredths. All the difference is, that it contains about two per cent. more hydrogen, one and one-half per cent. less carbon, and one-half per cent. less oxygen.

It has been attempted, with partial success, to substitute anthracite coal for the charcoal in gunpowder; but this substance differs considerably from the best charcoal in its chemical composition, and no mineral thus far known, either coal, bitumen, albertite, asphaltum, midletonite, &c., is so rich in oxygen as the grahamite. This element, being the principal one, we have to introduce abundantly in the gunpowder. The grahamite is the best substance thus far known for this purpose. Gunpowder made in this way is more compact and more powerful than the common gunpowder made of charcoal.

The second part of my invention consists simply in substituting the grahamite for the tar or other material used for the manufacturing of lamp-black. The quality of black made of wood is superior to that made of tar, and in general the quality will depend, besides on the mode of combustion, chiefly on the material employed. The lamp-black made by the imperfect combustion of the grahamite is of a superior, denser, and very opaque quality.

It is known how any flame produced by a hydrocarbon burns in chlorine gas—very smoky—simply because chlorine is no supporter of combustion for carbon, but only for the hydrogen. Therefore I introduce a small quantity of chlorine gas in the flame of the furnace when the material is burning, by the imperfect combustion of which the lamp-black is intended to be produced. In this way I diminish the combustion of carbon, increase the combustion of hydrogen, and thus increase the amount of carbon or lamp-black deposited. The formation of hydrochloric acid in place of water, carbonic oxide, and carbonic acid is no objection, but, to the contrary, an advantage in certain respects. Substances so rich in hydrogen that they cannot be burned without consuming also most of the carbon may in this way be also advantageously employed for the manufacture of new qualities of lamp-black.

What I claim, and wish to secure by Letters Patent, is—

1. The use of the mineral grahamite as a superior material in the manufacture of gunpowder.

2. The use of the mineral grahamite as a material for the manufacture of an improved lamp-black.

3. The introduction of chlorine gas in any quantity into the furnace when the imperfect combustion of the grahamite or other material from which the lamp-black is manufactured takes place.

P. H. VANDER WEYDE.

Witnesses:
JOS. BECSEY,
HENRY ERNI.